US011465190B2

(12) United States Patent
Lan et al.

(10) Patent No.: US 11,465,190 B2
(45) Date of Patent: Oct. 11, 2022

(54) BENDING DIE

(71) Applicant: SANOH INDUSTRIAL CO., LTD., Tokyo (JP)

(72) Inventors: Guang Ping Lan, Koga (JP); Kazuhiko Nakazato, Koga (JP)

(73) Assignee: SANOH INDUSTRIAL CO., LTD., Tokyo (JP)

( * ) Notice: Subject to any disclaimer, the term of this patent is extended or adjusted under 35 U.S.C. 154(b) by 5 days.

(21) Appl. No.: 16/961,012

(22) PCT Filed: Sep. 25, 2018

(86) PCT No.: PCT/JP2018/035473
§ 371 (c)(1),
(2) Date: Jul. 9, 2020

(87) PCT Pub. No.: WO2019/167320
PCT Pub. Date: Sep. 6, 2019

(65) Prior Publication Data
US 2020/0346266 A1   Nov. 5, 2020

(30) Foreign Application Priority Data
Mar. 1, 2018   (JP) .............................. JP2018-036102

(51) Int. Cl.
*B21D 11/02*   (2006.01)
*B21D 7/024*   (2006.01)
(Continued)

(52) U.S. Cl.
CPC .............. *B21D 11/02* (2013.01); *B21D 7/024* (2013.01); *B29C 53/08* (2013.01); *B21D 5/01* (2013.01); *B21D 7/06* (2013.01)

(58) Field of Classification Search
CPC . B21D 7/00; B21D 7/02; B21D 7/024; B21D 7/06; B21D 11/00; B21D 11/02;
(Continued)

(56) References Cited

U.S. PATENT DOCUMENTS 2,357,605 A * 9/1944 Nivison ................. B21D 37/10
153/34
4,747,768 A * 5/1988 Crupi .................... B29C 53/083
425/392

(Continued)

FOREIGN PATENT DOCUMENTS

| JP | H07329167 A | 12/1995 |
| JP | 2550307 Y2 | 10/1997 |

(Continued)

*Primary Examiner* — Adam J Eiseman
*Assistant Examiner* — Matthew Stephens
(74) *Attorney, Agent, or Firm* — Posz Law Group, PLC

(57) ABSTRACT

An object of the present invention is to provide a bending die that has a simple configuration and is capable of bending a rod-shaped body in a three-dimensional XYZ direction quickly and reliably, the bending die comprising a pair of forming dies clamped in a Z direction, wherein the forming dies have, respectively, rod-shaped body-forming recess portions, and rod-shaped body guide portions for guiding a rod-shaped body to the rod-shaped body-forming recess portions, the rod-shaped body-forming recess portions are each formed into a shape with a semicircular cross section that defines, between the forming dies when clamping the forming dies, a long, cylindrical cavity for forming the rod-shaped body bent in a three-dimensional XYZ direction, and the rod-shaped body guide portions are each formed into a V-shape that spreads outward from both sides of each of the rod-shaped body-forming recess portions having a semicircular cross section.

5 Claims, 7 Drawing Sheets

(51) Int. Cl.
  *B29C 53/08* (2006.01)
  *B21D 5/01* (2006.01)
  *B21D 7/06* (2006.01)
(58) Field of Classification Search
  CPC ......... B21D 11/06; B21D 11/07; B29C 53/08; B29C 53/083; B29C 53/086
  USPC ....................................................... 72/367.1
  See application file for complete search history.

(56) References Cited

U.S. PATENT DOCUMENTS

| | | | | |
|---|---|---|---|---|
| 5,934,132 | A * | 8/1999 | Nichol | B21D 7/063 |
| | | | | 72/301 |
| 5,979,201 | A * | 11/1999 | Horton | B21D 22/025 |
| | | | | 72/58 |
| 8,087,277 | B2 * | 1/2012 | Umeda | B21D 3/10 |
| | | | | 72/31.06 |
| 2017/0232492 | A1 * | 8/2017 | Isogal | B21C 37/08 |
| | | | | 72/31.06 |
| 2020/0283069 | A1 * | 9/2020 | Choi | B60J 5/043 |
| | | | | 72/58 |

FOREIGN PATENT DOCUMENTS

| | | | | |
|---|---|---|---|---|
| JP | 3484421 | B2 | 1/2004 | |
| KR | 20110074002 | A * | 6/2011 | ............. B21D 11/02 |

* cited by examiner

US 11,465,190 B2

BENDING DIE

CROSS REFERENCE TO RELATED APPLICATIONS

This application is a U.S. national stage of International Patent Application No. PCT/JP2018/035473 filed on Sep. 25, 2018 and is based on Japanese Patent Application No. 2018-036102 filed on Mar. 1, 2018, the disclosures of which are incorporated herein by reference.

TECHNICAL FIELD

The present invention relates to a bending die used for forming a rod-shaped body bent in a three-dimensional XYZ direction.

The term "rod-shaped body" used herein is intended to broadly refer to both solid and hollow rod-shaped articles.

BACKGROUND ART

For example, a rod-shaped resin tube that is bent three-dimensionally as in an automobile part such as a hose is formed using a bending die. As a forming technique using such bending die, there exist techniques disclosed in, for example, PTL 1 and PTL 2.

The technique disclosed in PTL 1 is as follows.

A method for blow-forming a three-dimensionally bent product, the method including the steps of: pressing and bending a parison P descending under a die 5 into a bent shape in a front-rear direction of a die 3 of one of opening/closing split dies 1a by means of an upright wall 4 that slides on a PL surface 2 of the opening/closing split die 1a; pressing and bending a lateral direction of the parison P into a bent shape in a lateral direction of the die 3 of the opening/closing split die 1a by means of a core 4a that moves side by side in front of the upright wall 4; and closing the opening/closing split dies 1a, 1b to blow-form the parison P (claim 1 of PTL 1).

An apparatus for blow-forming a three-dimensionally bent product that has the opening/closing split dies 1a, 1b, wherein the PL surface 2 of one of the opening/closing split dies 1a is provided with the upright wall 4 that slides, presses and bends the parison P into the bent shape in the front-rear direction of the die 3 of the opening/closing split die 1a, the parison P descending under the die 5, and the core 4a that pushes the parison into the die 3 is provided in front of the upright wall 4 (claim 4 of PTL 1).

The technique disclosed in PTL 2 is as follows.

A blow die used for blow-forming a bent, tubular blow-formed article, the blow die including: a lower die having a lower cavity corresponding to the lower side of a vertically divided cavity for forming the blow-formed article; a pair of cavity fences formed over a range for forming at least a bent portion of the blow-formed article, into a shape following a track of an edge on an upper surface of the lower die of the lower cavity, the cavity fences facing each other on the upper surface of the lower die, with the lower cavity therebetween; and fence advancing/retracting means that, when the lower die and an upper die paired therewith are clamped, retracts each of the cavity fences to a standby position that does not hinder the clamping outside the edge, and when pushing out the parison, moves each of the cavity fences from the standby position until the shape of each of the cavity fences at least matches the trac of the edge (claim 1 of PTL 2).

CITATION LIST

Patent Literature

[PTL 1] Japanese Patent No. 3484421
[PTL 2] Japanese Utility Model Registration No. 2550307

SUMMARY OF INVENTION

Technical Problem

However, the technique disclosed in above-mentioned PTL 1 has a complicated configuration provided with the opening/closing split dies 1a, 1b, the upright wall 4 that slides and then presses and bends the parison into the bent shape in the front-rear direction of the die 3 of the opening/closing split die 1a, and the core 4a that pushes the parison into the die 3 in front of the upright wall 4, and further, operation for control the apparatus is difficult. In addition, when closing the opening/closing split dies 1a, 1b to form the parison, the upright wall 4 and the core 4a need to be retracted to a position that does not hinder the closing of the opening/closing split dies 1a, 1b, thereby lengthening the formation cycle and changing the position of the parison that is pressed when retracting the upright wall 4 and the core 4a; thus, when the opening/closing split dies 1a, 1b are closed, a burr may be generated by sandwiching the parison.

The technique disclosed in PTL 2, on the other hand, is not provided with the core 4a of PTL 1 that pushes the parison into the die 3, and therefore has a simple configuration. However, the parison is pushed into the lower cavity 22 by using a pressing force for extruding the parison P from a nozzle of the extruder 50. Therefore, the parison can be securely loaded along the bending of the lower cavity 22 only by adjusting the speed of extruding the parison or controlling the movement of the lower die. In the technique disclosed in PTL 2 as well, when the upper and lower dies are clamped, the pair of cavity fences 24, 26 need to be retracted to the standby position that does not hinder the clamping, thereby lengthening the formation cycle, changing the position of the parison when retracting the cavity fences 24, 26, and causing a burr, as with the technique disclosed in PTL 1.

The present invention was contrived in view of the problems faced by the prior art described above, and an object of the present invention is to provide a bending die that not only has a simple configuration but also is capable of bending a rod-shaped body in a three-dimensional XYZ direction quickly and reliably.

Solution to Problem

In order to achieve the object described above, the present invention provides a bending die described in the following [1] to [3].

[1] A bending die used for forming a rod-shaped body bent in a three-dimensional XYZ direction, the bending die comprising a pair of forming dies that is to be clamped in a Z direction, wherein the forming dies each have a rod-shaped body-forming recess portion, and a rod-shaped body guide portion for guiding a rod-shaped body to the rod-shaped body-forming recess portion, the rod-shaped body-forming recess portion is formed into a shape with a semi-circular cross section that defines, with another rod-shaped body-forming recess portion when clamping the pair of forming dies, a long, cylindrical cavity for forming the rod-shaped body bent in a three-dimensional XYZ direction, and the rod-shaped body guide portion is formed into a V-shape that spreads outward from both sides of the rod-shaped body-forming recess portion having a semicircular cross section.

[2] The bending die according to [1] above, wherein the rod-shaped body guide portions are each formed into a comb shape in which the guide portions do not interfere with each other when the pair of forming dies is clamped.

[3] The bending die according to [1] or [2] above, wherein the pair of forming dies is divided in a Y direction which is a long direction thereof, and is bendable at the divided portion after the pair of forming dies is clamped.

Advantageous Effects of Invention

The bending die according to the present invention comprises the pair of forming dies clamped in the Z direction, and therefore has a simple configuration and is easily operable and controllable. Also, the forming dies each have the rod-shaped body-forming recess portion with a semicircular cross section that defines, between the forming dies when clamping the forming dies, the long, cylindrical cavity for forming a rod-shaped body bent in the three-dimensional XYZ direction, and the rod-shaped body guide portion that is formed into a V-shape that spreads outward from both sides of the rod-shaped body-forming recess portion having a semicircular cross section.

DESCRIPTION OF EMBODIMENTS

Embodiments of the bending die according to the present invention are described hereinafter with reference to the drawings.

Figure 1:
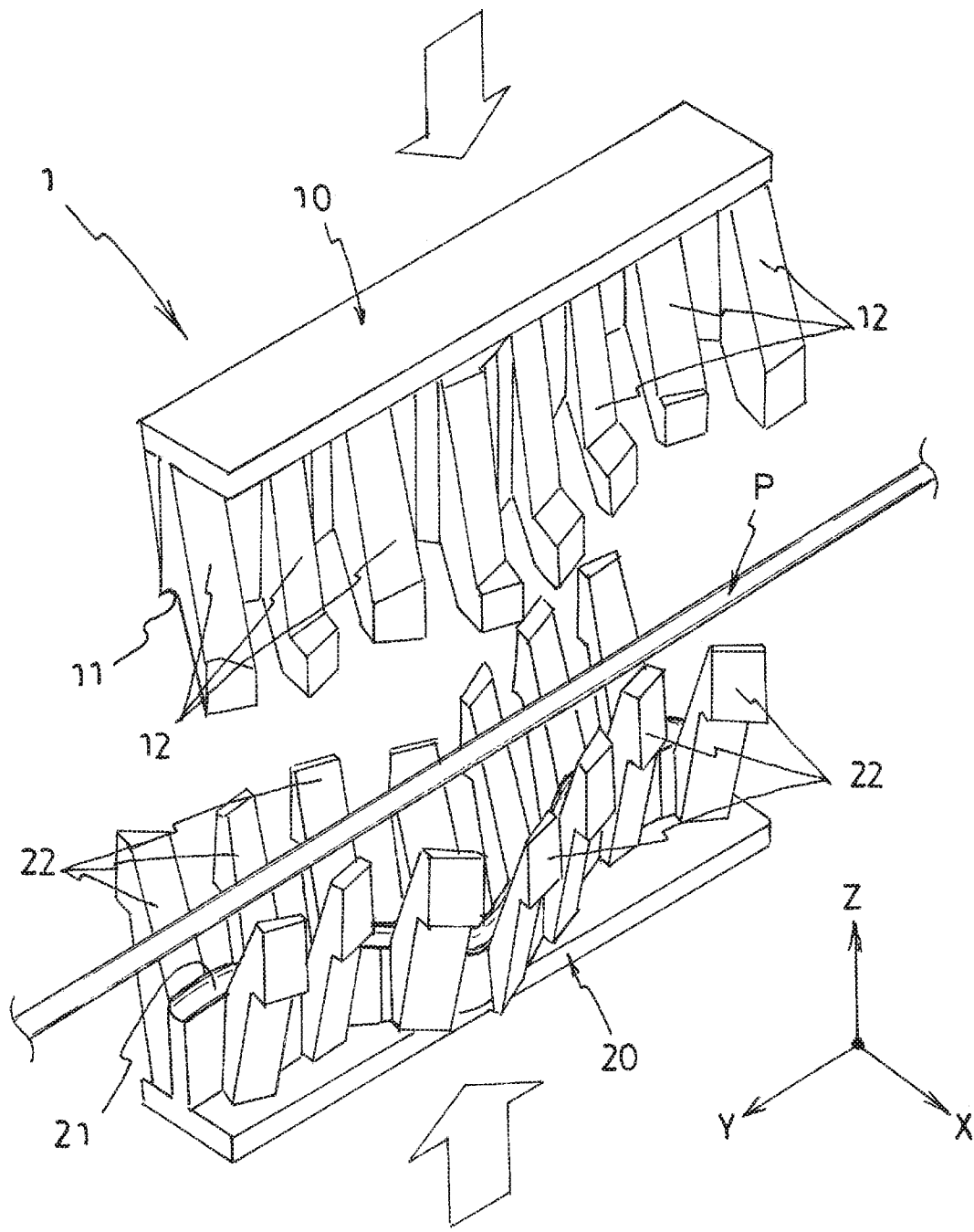
FIG. 1 is a schematic perspective view showing an embodiment of a bending die according to the present invention.

FIG. 1 is a perspective view showing an embodiment of the bending die according to the present invention. This bending die 1 is a bending die used for forming a rod-shaped body P bent in a three-dimensional XYZ direction, and is composed of a pair of forming dies 10, 20 clamped in a Z direction, that is, an upper die 10 and a lower die 20.

Note that, in the present specification, a direction of clamping the pair of forming dies 10, 20 is referred to as a Z direction, a longitudinal direction of the bending die 1 that is perpendicular to the Z direction as a Y direction, and a direction perpendicular to the Z direction and the Y direction as an X direction, as shown in FIG. 1. In addition, examples of the "rod-shaped body P" include a solid steel bar, a stainless steel bar, a resin bar, a hollow steel pipe, a stainless steel pipe, a resin pipe, and the like.

The pair of forming dies 10, 20 configured by the upper die and the lower die is clamped in the Z direction by an actuator which is not shown. Rod-shaped body-forming recess portions 11, 21 and rod-shaped body guide portions 12, 22 for guiding the rod-shaped body P to the rod-shaped body-forming recess portions are formed in the respective forming dies 10, 20.

The rod-shaped body-forming recess portions 11, 21 provided in the respective forming dies 10, 20 are each formed into a shape with a semicircular cross section that defines, between the forming dies 10, 20 when clamping the forming dies 10, 20, a long, cylindrical cavity for forming the rod-shaped body P bent in the three-dimensional XYZ direction. In other words, the rod-shaped body-forming recess portions 11, 21 are curved in the XYZ direction and formed into a product shape of the rod-shaped body P, and the cross section of each of the rod-shaped body-forming recess portions is formed as a semicircular recess portion having an inner diameter substantially equal to an outer diameter of the rod-shaped body P.

Figure 2:
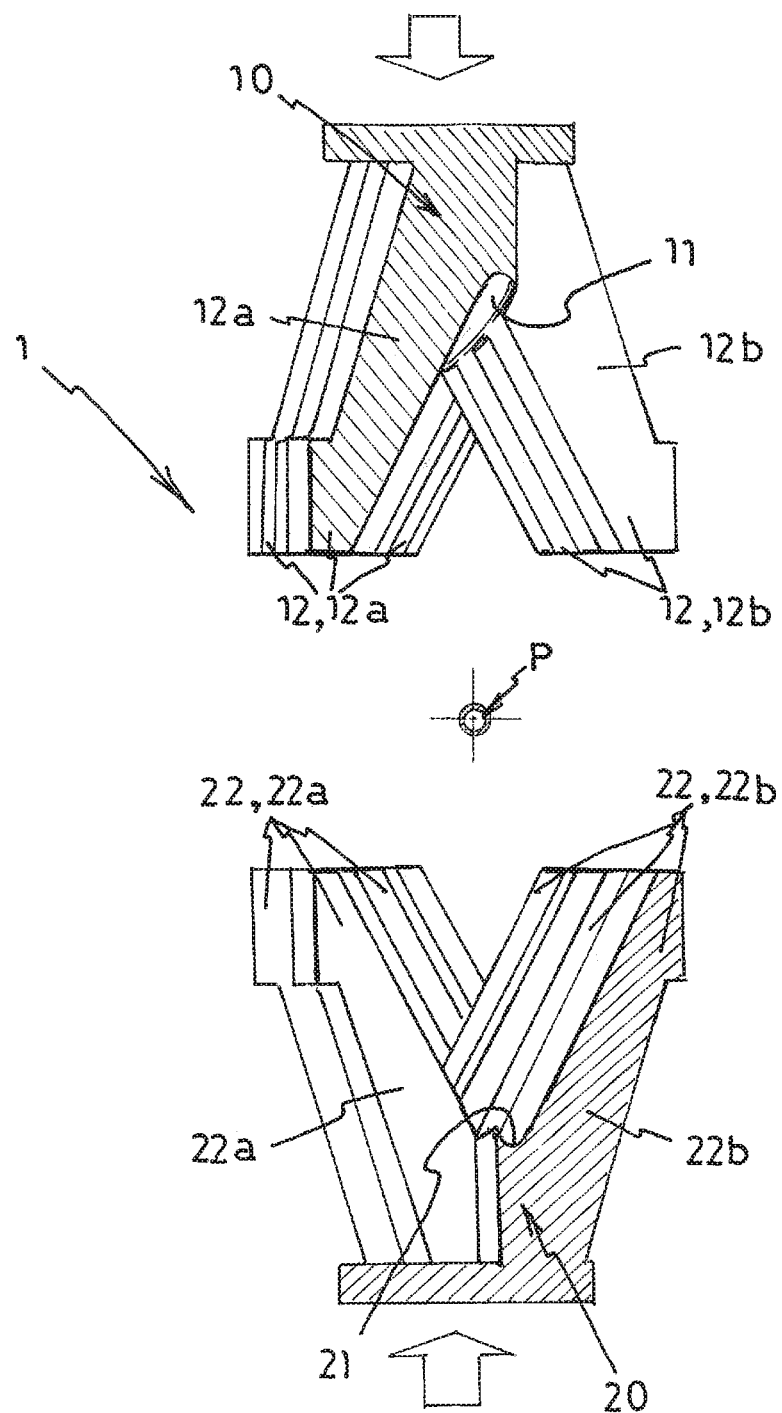
FIG. 2 is a schematic horizontal cross-sectional view of the bending die shown in FIG. 1.

The rod-shaped body guide portions 12, 22 for guiding the rod-shaped body P are each formed into a V-shape so as to spread outward from both sides of the rod-shaped body-forming recess portions 11, 21 with the semicircular cross section. Specifically, as shown in FIG. 2 and the like, rod-shaped body guide portions 12a, 12b provided on both sides of the rod-shaped body-forming recess portion 11 of the upper die 10 are formed into an inverted V-shape spreading downward, and rod-shaped body guide portions 22a, 22b provided on both sides of the rod-shaped body-forming recess portion 21 of the lower die 20 are formed into a V-shape spreading upward.

Note that, in the present specification, "V-shape" does not mean only a V-shape in a strict sense, but is also a concept including a shape obtained by deforming the V-shape. Examples of the V-shape include an asymmetric V-shape, a V-shape including an arc, a U-shape, and the like.

Figure 5:
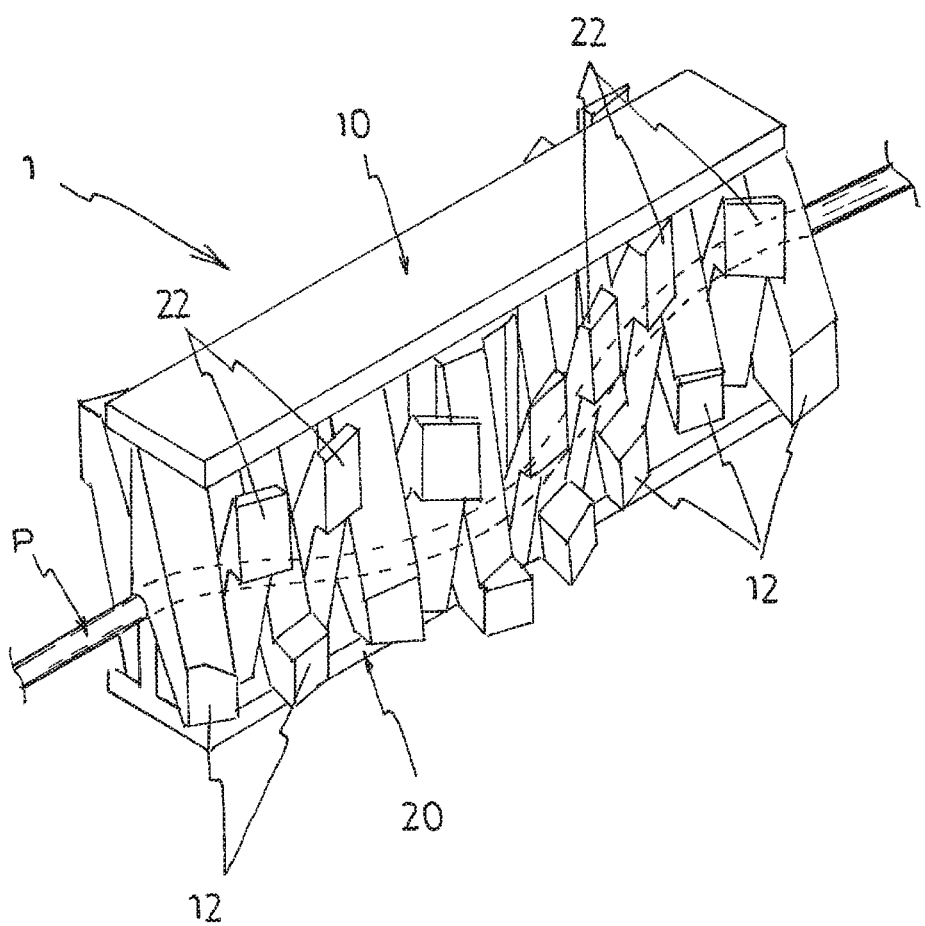
FIG. 5 is a schematic perspective view showing a state in which the bending die shown in FIG. 1 is clamped.

Furthermore, the rod-shaped body guide portions 12, 22 are each formed into a comb shape in which the guide portions do not interfere with each other when the pair of forming dies 10, 20 is clamped. Specifically, as shown in FIGS. 1, 5 and the like, the rod-shaped body guide portions 12, 22 are formed into comb shapes that are shifted from each other in such a manner that the rod-shaped body guide portion 12 provided in the upper die 10 is clamped in such a manner as to be fit into the gap of the rod-shaped body guide portion 22 provided in the lower die 20.

The bending die 1 according to the present invention having the configuration described above is operated as follows, to bend the rod-shaped body P in the three-dimensional XYZ direction.

Figure 3:
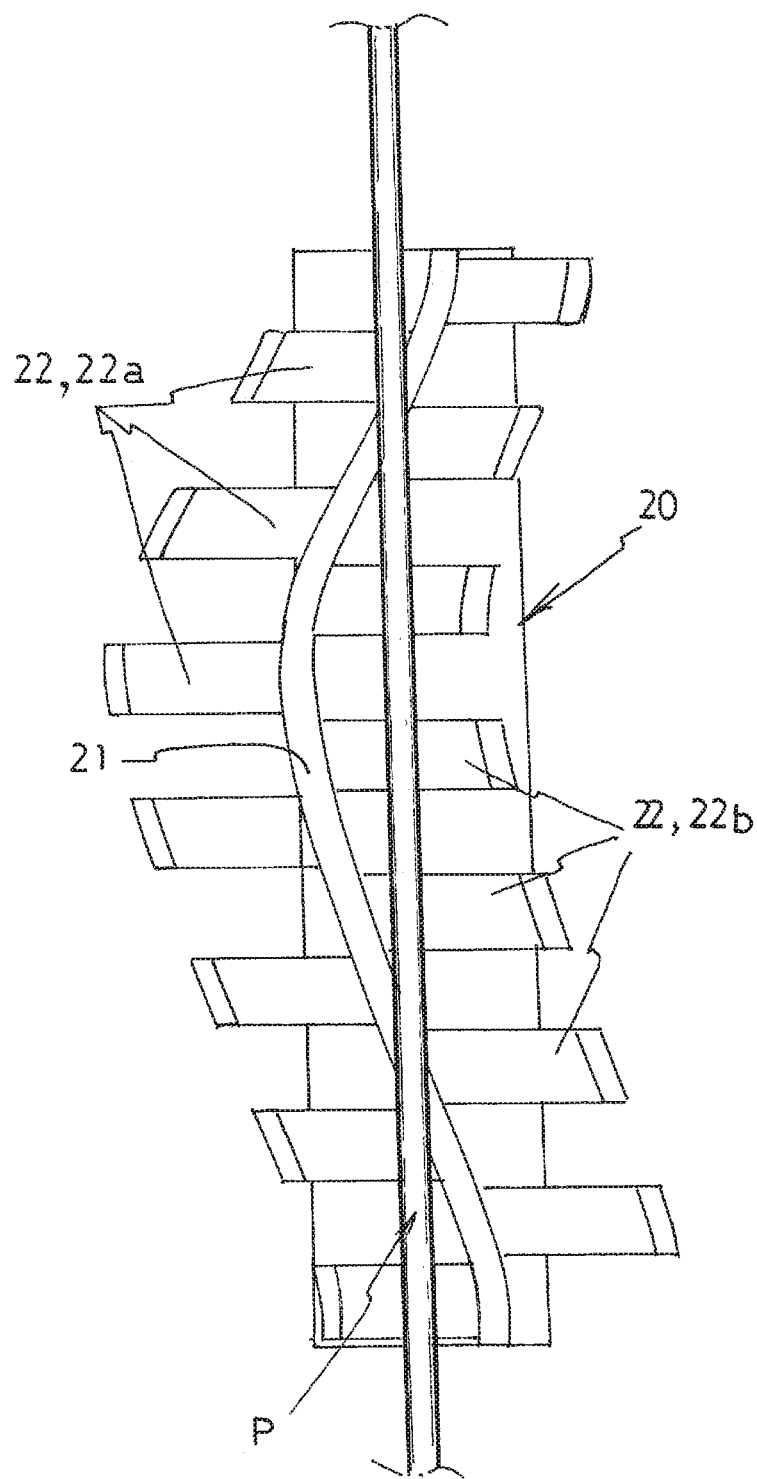
FIG. 3 is a schematic plan view of a lower die of the bending die shown in FIG. 1.

First, as shown in FIGS. 1 to 3, the rod-shaped body P to be processed is set in the bending die 1 of the present invention composed of the upper die 10 and the lower die 20. In so doing, the rod-shaped body P is set so as to be positioned between the rod-shaped body guide portions 12, 22. Setting the rod-shaped body P in this manner can be performed easily because the rod-shaped body guide portions 12, 22 each have a wide opening in which the V-shape thereof spreads. Furthermore, even in a case where the rod-shaped body P needs to be curved beforehand so as to enter between the rod-shaped body guide portions 12, 22, this curving is rough and does not need to be precise.

Figure 4:
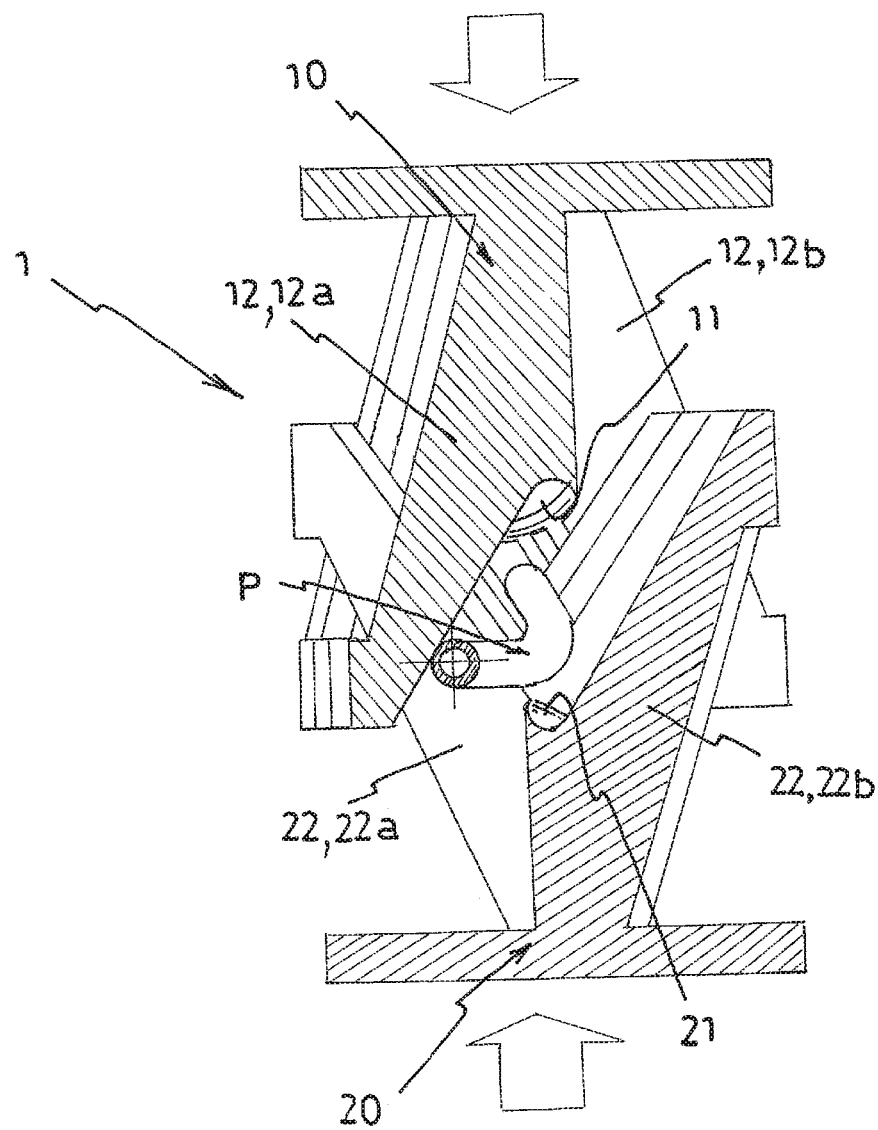
FIG. 4 is a schematic horizontal cross-sectional view showing the middle of clamping the bending die shown in FIG. 1.

Subsequently, the bending die 1 of the present invention composed of the upper die 10 and the lower die 20 is clamped in the Z direction by an actuator which is not shown. With this clamping, as shown in FIG. 4, the set rod-shaped body P slides toward the rod-shaped body-forming recess portions 11, 21 while being gradually bent along slopes of the rod-shaped body guide portions 12, 22, and the rod-shaped body P approaches the rod-shaped body-forming recess portions 11, 21 and is fitted thereto while being bent also in a direction other than the Z direction which is a clamping direction.

Figure 6:
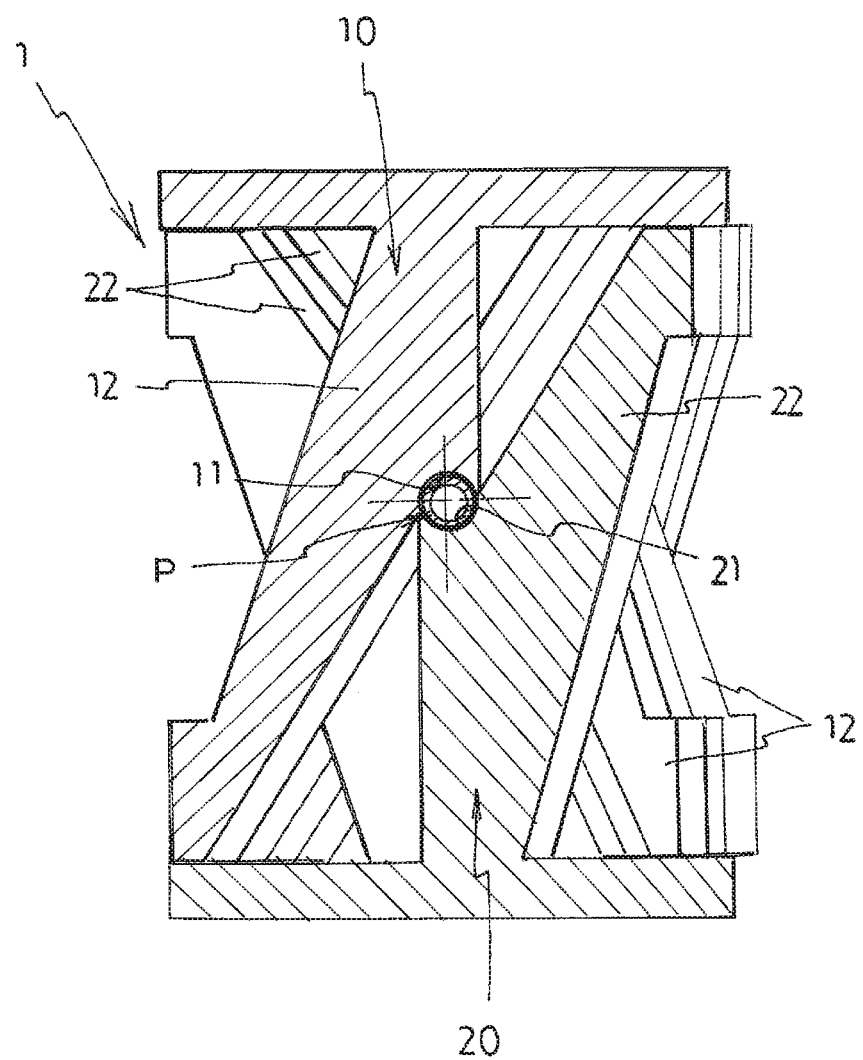
FIG. 6 is a schematic horizontal cross-sectional view showing the state in which the bending die shown in FIG. 1 is clamped.

Next, as shown in FIGS. 5 and 6, the bending die 1 of the present invention composed of the upper die 10 and the lower die 20 is clamped completely, and the rod-shaped body P is sandwiched by the rod-shaped body-forming recess portions 11, 21 formed in the upper die 10 and the lower die 20 respectively, and bent into a final product shape. In so doing, since the entire circumference of the rod-shaped body P is surrounded by the rod-shaped body-forming recess portions 11, 21, pressure can be applied to the inside of the rod-shaped body. Thus, in a case where the rod-shaped body P to be processed is a hollow resin pipe, a pressurized gas or the like can be introduced into the rod-shaped body P if necessary, from the perspective of preventing buckling during the formation of the rod-shaped body P.

According to the bending die 1 of the present invention described above, since the rod-shaped body guide portions 12, 22 spread into the V-shape, the rod-shaped body P to be processed can easily be set. In addition, the set rod-shaped body P slides toward the rod-shaped body-forming recess portions 11, 21 while being gradually bent along the slopes of the rod-shaped body guide portions 12, 22 as the pair of forming dies 10, 20 is clamped, and the rod-shaped body P is fitted into the rod-shaped body-forming recess portions 11, 21 while being bent also in a direction other than the Z direction which is the clamping direction. Then, when clamping the bending die 1 completely, since the entire circumference of the rod-shaped body P is surrounded by the rod-shaped body-forming recess portions 11, 21 formed in the respective forming dies 10, 20, pressure can be applied to the inside of the rod-shaped body P, preventing buckling and the like that could occur during formation thereof.

Owing to these facts described above, the bending die 1 according to the present invention not only has a simple configuration but also can bend the rod-shaped body P in the three-dimensional XYZ direction quickly and reliably.

The bending die 1 according to the present invention may have the following modified embodiments.

Figure 7:
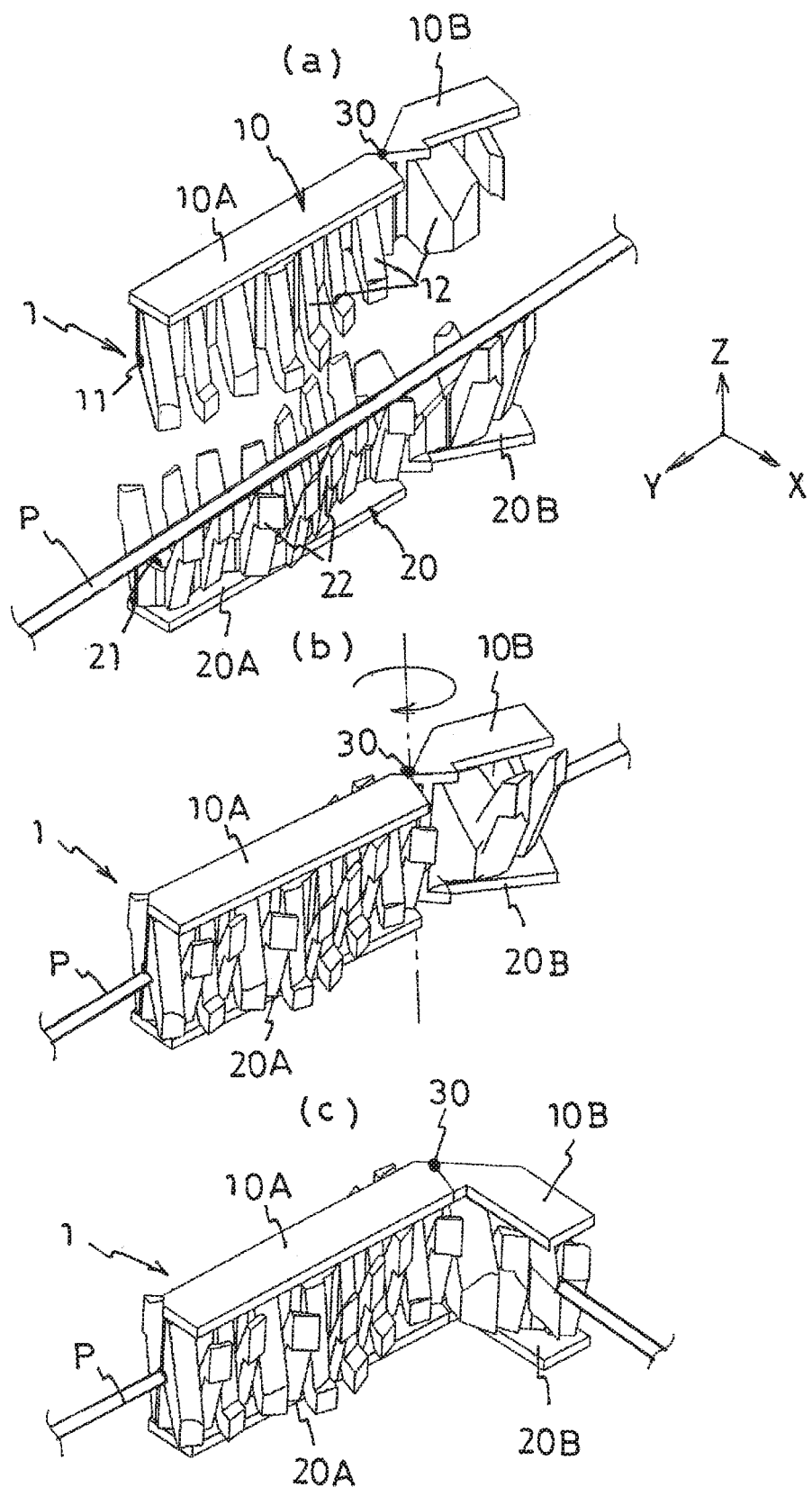
FIG. 7 is a schematic perspective view showing another embodiment of the bending die according to the present invention, where (a) is a diagram showing a step of setting a rod-shaped body, (b) a diagram showing a bending step following clamping, and (c) a diagram showing a state after the bending step.

FIG. 7 shows a configuration in which the pair of bending die 1 is divided in the Y direction which is the long direction thereof, and can be bent at the divided portion after the pair of forming dies is clamped.

Specifically, in the bending die 1, the upper die 10 and the lower die 20 are made longer in the Y direction thereof, and two members 10A, 10B and 20A, 20B are coupled by a hinge 30.

Note that, in FIG. 7, the same reference numerals are used on the members same as those of the embodiment shown in FIG. 1.

According to the bending die 1 of the embodiment shown in FIG. 7, in the step of setting the rod-shaped body P, the rod-shaped body P can be set easily by linearly arranging the upper die 10 and the lower die 20 composed respectively of the two members 10A, 10B and 20A, 20B as shown in (a), and then, after clamping the upper die 10 and the lower die 20, the upper die 10B and the lower die 20B are rotated about the hinge 30 as shown in (b), to obtain the state shown in (c). As a result, the rod-shaped body P can be bent at a sharper angle and in a more complex manner.

The bending die 1 according to the present invention can be created by a three-dimensional printing technique using metal (such as aluminum, stainless steel), a heat resistant resin, or the like based on a design drawing and the like. Since the three-dimensional printing technique using metal and other materials is well-known, a detailed description thereof is omitted herein.

Various embodiments of the bending die according to the present invention were described above. However, needless to say, the present invention is not limited to the embodiments described above and can be implemented in various other modes without departing from the gist of the present invention.

INDUSTRIAL APPLICABILITY

The bending die according to the present invention has a simple configuration and is capable of bending a rod-shaped body in a three-dimensional XYZ direction quickly and reliably. Thus, the present invention can be widely used for bending a variety of resin or metal pipes and hoses that are used particularly as home appliances, automobile parts, and the like.

REFERENCE SIGNS LIST

1 Bending die
10, 10A, 10B Upper die
20, 20A, 20B Lower die
11, 21 Rod-shaped body-forming recess portion
12, 12a, 12b, 22, 22a, 22b Rod-shaped body guide portion
30 Hinge
P Rod-shaped body

The invention claimed is:
1. A bending die used for forming a rod-shaped body bent in a three-dimensional XYZ direction, the bending die comprising:
    first and second forming dies configured to be clamped in a Z direction, wherein the first and second forming dies each comprise
    a rod-shaped body-forming recess portion, wherein the rod-shaped body-forming recess portions of the first and second forming dies are semicircular in cross section and together define, when the first and second forming dies are in a clamped position, an elongated, non-straight continuous cylindrical cavity of fixed form for forming the rod-shaped body in a three-dimensional XYZ direction, and
    means for engaging the rod-shaped body and guiding the rod-shaped body towards the rod-shaped body-forming recess portions while the forming dies are moved from an open position to a bending position,
    wherein the each of the means for engaging and guiding includes a plurality of projections that are separated from each other in a longitudinal direction and when the first and second forming dies are in a bending position the plurality of projections of the means for engaging and guiding of the first die interlace with the plurality of projections of the means for engaging and guiding of the second die.

2. The bending die according to claim 1, wherein
the plurality of projections of the means for engaging the rod-shaped body and guiding the rod-shaped body towards the rod-shaped body-forming recess portions while the forming dies are being moved from the open position to the bending position include rod-shaped body guide portions,
each of the rod-shaped body guide portions project away from the corresponding rod-shaped body-forming recess portion, spread outwardly in a V-shape from the corresponding rod-shaped body-forming recess portion, and are arranged along a contour of the corresponding rod-shaped body-forming recess portion.

3. A method of bending a rod-shaped body in a three-dimensional XYZ direction, wherein the method comprises:
providing a first forming die including a first rod-shaped body-forming recess portion and a first plurality of guide portions configured in a V-shape to guide a rod-shaped body into the first rod-shaped body-forming recess portion, wherein the first plurality of guide portions project away from the first rod-shaped body-forming recess portion and are separated from each other in a longitudinal direction of the first rod-shaped body-forming recess portion,
providing a second forming die including a second rod-shaped body-forming recess portion and a second plurality of guide portions configured in a V-shape to guide the rod-shaped body into the second rod-shaped body-forming recess portion, wherein the second plurality of guide portions project away from the second rod-shaped body-forming recess portion and are separated from each other in a longitudinal direction of the second rod-shaped body-forming recess portion,
moving the first forming die and the second forming die from an open position to a bending position such that the first plurality of guide portions of the first forming die are interlaced with the second plurality of guide portions of the second forming die in a non-interfering manner, wherein in the bending position the rod-shaped body-forming recess of the first forming die and the rod-shaped body-forming recess of the second forming die define an elongated, non-straight rod-shaped body-forming cavity of fixed form in a three-dimensional XYZ direction with the first rod-shaped body-forming recess portion and the second rod-shaped body-forming recess portion, and
bending the rod-shaped body with the rod-shaped body guide portions by engaging and guiding the rod-shaped body with the rod-shaped body guide portions towards the rod-shaped body-forming recess portions while the forming dies are being moved from the open position to the bending position.

4. The method of bending a rod-shaped body according to claim 3, wherein the method includes providing each of the first rod-shaped body-forming recess portion and the second rod-shaped body-forming recess portion in a shape that is semi-circular in cross-section.

5. The method of bending a rod-shaped body according to claim 3, wherein the method includes
providing the first plurality of guide portions along a contour of the first rod-shaped body-forming recess portion, and
providing the second plurality of guide portions along a contour of the second rod-shaped body-forming recess portion.

* * * * *